(12) United States Patent
Nelson et al.

(10) Patent No.: US 7,869,963 B2
(45) Date of Patent: *Jan. 11, 2011

(54) SYSTEM AND METHOD FOR CALCULATING CHEMICAL USAGE

(75) Inventors: Mark B Nelson, Orinda, CA (US); Dannie Ray Barger, Riverside, CA (US)

(73) Assignee: Force Flow, Concord, CA (US)

(*) Notice: Subject to any disclaimer, the term of this patent is extended or adjusted under 35 U.S.C. 154(b) by 277 days.

This patent is subject to a terminal disclaimer.

(21) Appl. No.: 12/024,342

(22) Filed: Feb. 1, 2008

(65) Prior Publication Data

US 2008/0189055 A1 Aug. 7, 2008

Related U.S. Application Data

(62) Division of application No. 11/506,141, filed on Aug. 16, 2006, now Pat. No. 7,343,250.

(51) Int. Cl.
*G01F 13/00* (2006.01)
(52) U.S. Cl. ........................................................ 702/45
(58) Field of Classification Search .................... 702/45
See application file for complete search history.

(56) References Cited

U.S. PATENT DOCUMENTS

2004/0155057 A1 8/2004 Soberanis et al.

OTHER PUBLICATIONS

Force Flow, Electronic scale for chemical day tanks and IBC Totes, bulletin 40, Nov. 2, 2004, p. 1-2.*

* cited by examiner

*Primary Examiner*—Tung S Lau
(74) *Attorney, Agent, or Firm*—Buchanan Ingersoll & Rooney PC

(57) ABSTRACT

A system and method of calculating chemical usage during a refilling of a supply tank, which includes the steps of providing a chemical system having a first supply tank of known capacity, wherein the tank is mounted upon an electronic scale. The scale is capable of generating a series of signals related to the weight of the tank when empty and at various levels of fill. A system controller receives a series of signals from the scale relating to the weight of the tank when empty and at various levels of fill. The first supply tank is filled from a source of chemical feed and the fill time for the filling of the first supply tank is obtained. The system controller inputs the series of signals from the scale relating to the weight of the tank when empty and at various levels of fill and calculates a usage during refilling based on a feed rate times the fill time.

15 Claims, 3 Drawing Sheets

SYSTEM AND METHOD FOR CALCULATING CHEMICAL USAGE

TECHNICAL FIELD

This invention relates to a system and method for calculating chemical usage during refilling of chemical tanks used in municipal water and wastewater treatment plants.

BACKGROUND

The treatment of water and wastewater traditionally includes treatment with various chemicals such as chlorine & sodium hypochlorite for disinfection, sulfur dioxide and sodium bisulphate for dechlorination, hydrofluosilicic acid for fluoridation and many others for coagulation, ph control, etc. Many state regulations require that municipal water agencies document their chemical usage in order verify proper dosages. A common way of tracking chemical usage is to simply place a chemical cylinder or drum on a weighing scale and track the weight loss on a daily basis. However, in order to insure a safe process and a safe plant, treatment facilities need to keep accurate records of essential information such as current chemical feed rate, how much chemical has been fed, and how much chemical remains.

Accordingly, what would be desirable would be a chemical inventory management system for projecting and calculating chemical usage during refilling of a chemical tank used in the municipal waste water treatment industry, and further wherein the system and method of calculating usage is not only automated but is accurate.

SUMMARY

Thus, in accordance with one aspect of the invention, a method of calculating chemical usage during a refilling of a supply tank comprises: providing a chemical system comprising: a first supply tank of known capacity, the tank mounted upon an electronic scale, the scale being capable of generating a series of signals related to the weight of the tank when empty and at various levels of fill; and a system controller for receiving the series of signals from the scale relating to the weight of the tank when empty and at various levels of fill; filling the first supply tank from a source of chemical feed; obtaining a fill time for the filling of the first supply tank; inputting into the system controller the series of signals from the scale relating to the weight of the tank when empty and at various levels of fill; and calculating a usage during refilling based on a feed rate times the fill time.

In accordance with another aspect of the invention, a system for calculating chemical usage comprises: a supply tank of known capacity, the tank mounted upon an electronic scale, the scale being capable of generating a series of signals related to the weight of the tank when empty and at various levels of fill; and a system controller: for receiving a series of signals from the scale relating to the weight of the supply tank; for calculating a loss in feed rate at the time the filling of the day tank begins; for calculating a time it takes to fill the day tank; and for calculating an estimate of the usage based on a fill rate and the time it took to fill the day tank.

BRIEF DESCRIPTION OF THE DRAWINGS

The invention will now be described in greater detail with reference to the preferred embodiments illustrated in the accompanying drawings, in which like elements bear like reference numerals, and wherein.

DETAILED DESCRIPTION

The system and the method of its use will be described in the context of sodium hypochlorite as the gas or chemical. However, it can be appreciated that these materials are not limiting and that this system and its use could work with a wide variety of gases and chemicals, including chlorine or sulfur dioxide.

Figure 1:
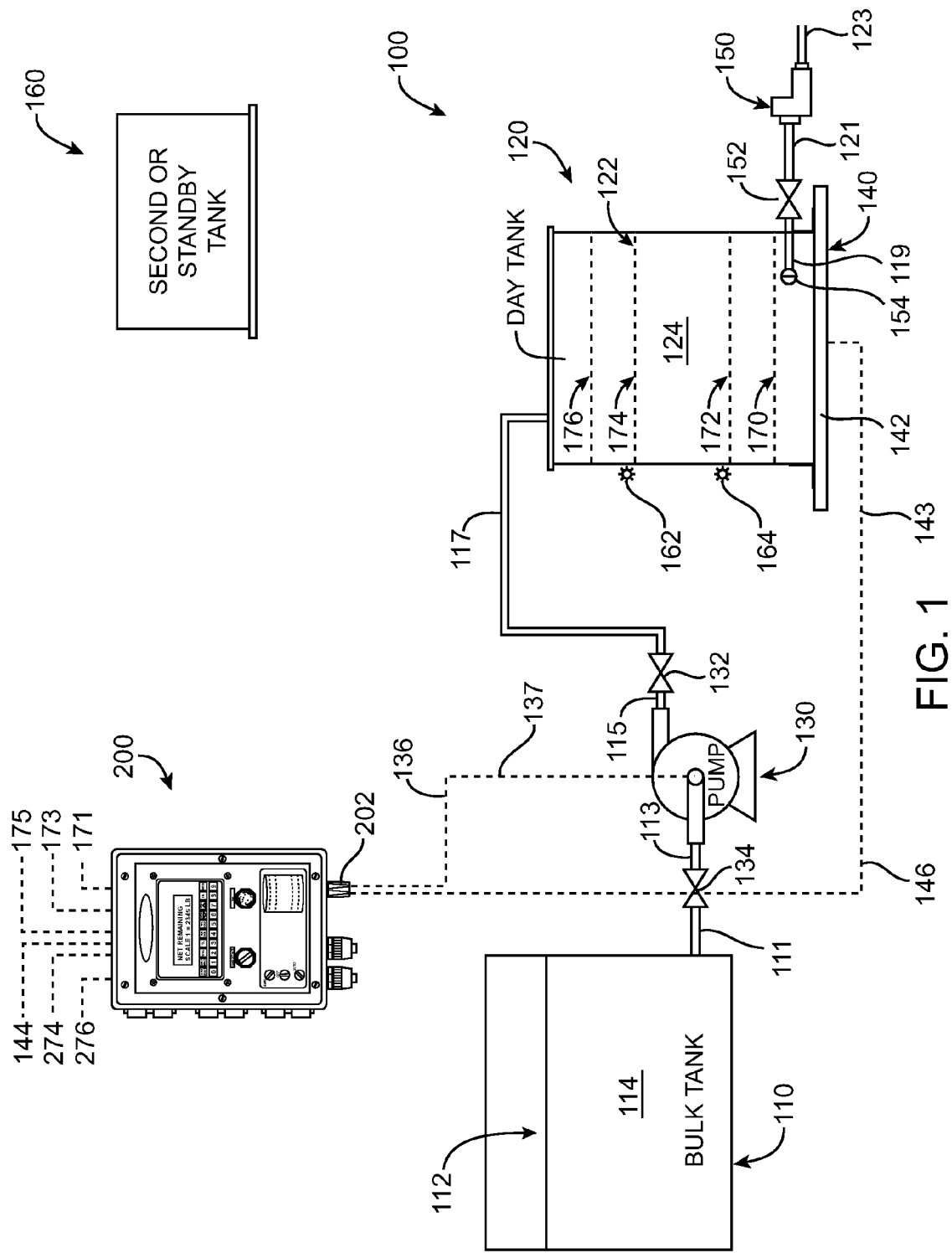
FIG. 1 shows an elevation view of a system for projecting and calculating chemical usage in a municipal water facility.

FIG. 1 shows a system 100 comprising a first vessel or bulk tank 110, which provides a variable quantity 112 of gas or chemical 114 to a second vessel or supply tank 120. It can be appreciated that the first vessel or bulk tank 110 can be replaced by any suitable source of chemical feed. The second vessel or supply tank 120 also has a variable quantity 122 of gas or chemical 124 and is configured to receive the variable quantity 112 of gas or chemical 114 from the bulk tank 110. The supply or day tank 120 has a known capacity, and is preferably mounted upon an electronic scale 140, the scale being capable 140 of generating a series of signals 143 related to the weight of the tank 120 when empty and at various levels of fill.

The first and second vessels or tanks 110, 120 are preferably vertical tanks designed to hold a gas or a chemical 114, 124 used in the treatment of water or wastewater. However, the type of vessel is not limiting and the system and methods according to this invention can be used with a variety of vessels. In addition, as indicated above, the system 100 is not limited to the treatment of water or wastewater and the system and its use can work with a wide variety of applications wherein gas or chemical detection and display of the amount of gas or chemical remaining in the vessel is needed.

As shown in FIG. 1, the first vessel or bulk supply tank 110 supplies chemicals in the form of a gas or chemical 114 through line 111 to a first or bulk tank valve 134 and through line 113 to a chemical feed flow controller or transfer pump 130 for controlling the flow of chemical 114 from the source of chemical feed or bulk tank 110 to the supply tank 120. The chemical feed flow controller or transfer pump 130 can be any suitable pump or motorized ball valve system.

The gas or chemical 114 is pumped by the transfer pump 130 through line 115 to a second or day tank valve 132 and then through line 117 to the second vessel or day tank 120. In a typical municipal chemical feed application, chemical 124 is fed out of the supply tank 120 (also known as a day tank) on a 24-hour, 7 day a week schedule. The supply tank or "day tank" 120 is typically in the 50 to 1000 gallon range for municipal water facilities depending on the plant capacity and water system being treated. However, it can be appreciated that the system and methods described herein can be utilized using vessels or tanks 110, 120 having larger or smaller capacities than recited herein.

The day or supply tank 120 is preferably equipped with a series of relays 170, 172, 174, and 176, which correspond to a series of usage and/or filling reference points. The first relay 170 corresponds to set point 1, "low level alarm" 171; the second relay or low weight relay 172 corresponds to set point 2, "transfer pump on"; the third relay or high weight relay 174 corresponds to set point 3, "transfer pump off"; and the fourth relay 176 corresponds to set point 4, "high level alarm" 173. In addition, the day tank 120 can be equipped with an option lighting system comprised of a "transfer pump off" light 162 and a "transfer pump on" light 164. The "transfer pump off" and "transfer pump on" lights 162, 164 are preferably green in nature; however, other suitable colors can be implemented. The series of relays 170, 172, 174, and 176 and the transfer pump off and on lights 162, 164 each produce a corresponding signal, which is transmitted to a system controller 200 via controller line 146.

As shown in FIG. 1, the second vessel or day tank 120 is supported on an electronic scale 140 in the form of a platform or chemical scale, which generates a series of electronic signals 143, which are transmitted to the system controller 200 via the controller line 146. The electronic signals 143 include information related to the empty weight, full weight and partially full weight of the supply or day tank 120. The moveable electronic scale 140 typically includes a platform member 142 configured to support the supply or day tank 120. In operation, an electronic load cell (not shown) generates an electronic signal 143, which is a function of the variable quantity 122 of gas or chemical 124 in the vessel or supply tank 120.

The system 100 also includes an exit line 119 from the supply tank 120 to a discharge valve 152. The discharge valve 152 feeds the gas or chemical 124 to a metering pump 150. The metering pump 150 in turn feeds the gas or chemical 124 to a water system (not shown) through line 123.

Figure 3:
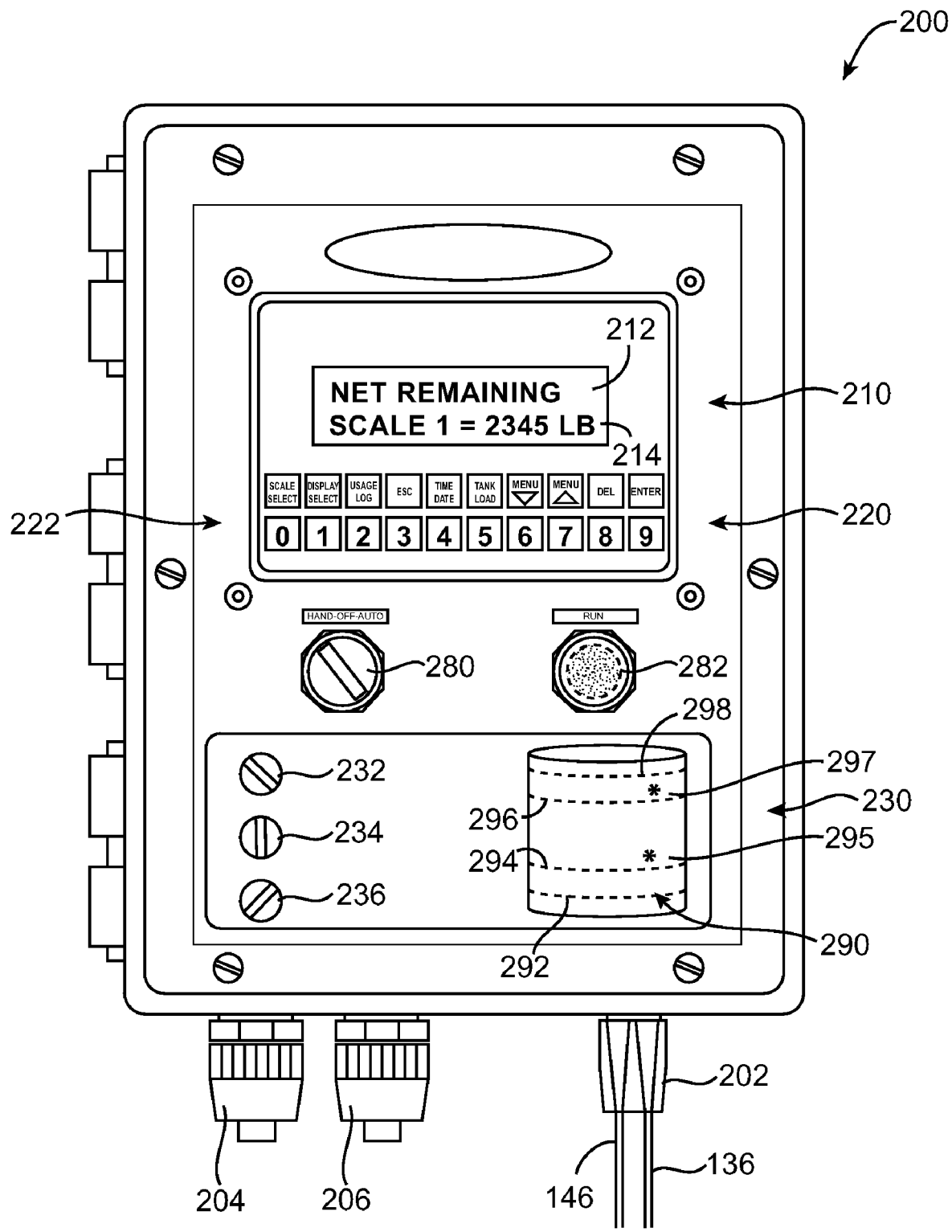
FIG. 3 shows a schematic view of a controller face illustrating the keypad functions and display of the controller used in the system and method of the present invention.

In one embodiment, the system 100 includes a system controller 200, which includes a fully automatic set up that includes a plurality of relays 250 configured to receive the low weight relay signal 172, which turns the transfer pump 130 "on", and a high weight relay signal 174, which turns the transfer pump 130 "off." The tank load key 280 as seen in FIG. 3 that you see on the front of the system controller 200 is the key that the operator uses in a "manual mode" to accurately track chemical 114, 124.

Pause and Projecting chemical usage during tank refills:

For municipal chemical feed applications, chemical 124 is typically fed out of the supply tank 120 on a 24 hour, 7 days a week schedule. This is often referred to as a "day tank" 120 and typically is in the 50 to 1000 gallon range depending on the plant capacity. It can be appreciated that the capacity of the day tank 120 can have any suitable capacity and can be less than or greater than the 50 to 1000 gallon capacity. An internal usage accumulator 144 within the system controller 200 logs or tracks the amount of chemical 124 supplied to the water system (not shown) for any desired period of time. In use, the internal usage accumulator 144 receives a signal via controller line 146. The data from the internal usage accumulator 144 is then used to calculate chemical usage from the day tank 120 to the water system via the metering pump 150. The value associated with the internal usage accumulator 144 increases as the weight in the tank 120 decreases. However, in use, when a refill process is initiated, the usage accumulator 144 must "pause usage accumulation" until the refill process has ended in order to keep the usage values correct. Thus, the internal usage accumulator 144 is stopped or paused during refilling and the corresponding value related to the internal usage accumulator 144 remains constant. Accordingly, in order to obtain an accurate usage of chemical, the total usage during the refilling process must be added to obtain the total usage for any given or specified period of time.

In the manual mode, when the day tank 120 is refilled from the "bulk supply tank" 110, the operator must keep track of when the refill starts and stops by manually interfacing a tank load key 280 in order to keep an accurate usage history. Because the system 100 is filling and feeding out of the day tank 120 at the same time, the system 100 calculates the approximate usage during this period is by checking the feed rate via loss in weight at the time the fill starts, measure the time it takes to fill, and add an estimate usage amount to the usage data based on rate and time period. The bulk supply tank 110 can have a 1,000 to 10,000 gallon capacity or the day tank 120 can be refilled from any suitable source of chemical feed 124. The tank load key 280 (FIG. 3) controls the refilling of the day tank 120 and includes a plurality of settings, including: "SEMI AUTOMATIC" 232, which reflects the operator initiated tank filling with automatic shut-off when full; "MANUAL" 234, which reflects that the transfer pump 130 or valve 134 is manually operated (Hi and Lo Alarms still work), and "AUTO" 236, which reflects automatic tank filling with automatic shut-off when full.

In a fully automatic mode, the low level relay 172 automatically starts the chemical transfer pump 130/valve 134, and a high weight relay 174 shuts it off. Because the system 100 is filling and feeding out of the day tank 120 at the same time, the system 100 calculates the approximate usage during this period is by checking the feed rate via loss in weight at the time the fill starts, measure the time it takes to fill, and add an estimate usage amount to the usage data based on rate and time period. This usage amount data is then integrated and stored into a usage data log within the system controller 200 for later use. The usage data log is preferably a 31-day log; however, it can be appreciated that any suitable period of time from 7 days to 6 months could be used.

An example of the system and method in operation under a fully automatic mode, would include a day tank 120 having a 400-gallon capacity tank with fluoride holding approximately 4000 lbs of chemical. A low weight set point or relay 172 (transfer pump 130 "on") is set at 200 lbs and a high weight set point or relay 174 (transfer pump "off") is set at 3200 lbs. In use, the system 100 is feeding at a rate of 100 lbs per hour to process at the time the low weight relay 172 is engaged. If it takes 30 minutes for the transfer pump 130 to refill the tank 120. After 24 hours has elapsed, the internal usage accumulator 144 has logged 2400 lbs of chemical use. So during the refill process, the "pause and project function took the 100 lbs per hour feed rate value×0.5 hours (30 minutes)=50 lbs of use during the refill process. Accordingly, the total use during the 24 hour period is 2400 lbs+50 lbs=2450 lbs.

Bulk supply tracking:

Typically, a day tank 120, and is refilled via a bulk supply tank 110. Because the system 100 tracks usage via the tank load key 280 and pause and project function, the system 100 can also keep track of the bulk supply tank 110 by tracking throughput. In the manual mode, the operator pushes the tank load key 280 to tell the system controller 200 that they are going to refill the day tank 120. The system controller 200 then keeps track of beginning and ending tank weights (plus anything added from the "pause and project" calculation) and subtracts this from a set value that was entered into the system controller 200 at the time the bulk tank 110 was filled. This function serves as a back up for the bulk tank 110 level devices, or could replace them completely if the operators are diligent about the operation of this function.

Manual mode example:

Using the example of the fluoride tank or day tank 120 above, when the chemical delivery truck arrives and the "Bulk tank" 110 is filled to its capacity of 50,000 lbs, the operator enters the full value in pounds via the controller key pad 220. When the "day tank" 120 needs to be refilled, the operator pushes the tank load key 280 (say 200 lbs), the controller registers this weight. After refilling the day tank, the operator pushes the tank load key 280 again (at say 3200 lbs) to indicate that the fill is finished. The system controller 200 then takes the difference (3200−200=3000 lbs) plus the amount that was used from the Pause and project value above (50 lbs) and subtracts these values from the prior bulk tank 110 value (in this case 50,000 lbs) So 50,000−3,000−50=46, 950 lbs. If the operator fills at the same point and shuts off at the same point, and if the feed rate to process (pause and project value) is the same, then after the next fill, the amount in the bulk tank 110 would be 46,950−3050=43,900 lbs. This process goes on until the bulk tank 110 is refilled and a new refill value is established.

Supply exhausted alarm:

Most chlorine feed applications in water and waste water markets have a first or primary supply or day tank 120 online and a second or standby tank 160 on standby. These tanks typically consist of 150 lbs cylinders or 2000 lbs ton containers. When the pressure drops to a point where the chemical 124 (typically in the form of a gas) is no longer being fed from the online day tank 120, an automatic switchover device (not shown) that detects pressure drop usually is used to switch from the online day tank 120 to the standby tank 160. A zero feed rate occurs when the tank 120 is no longer feeding chemical 124 to the metering pump 150 and sends a signal via the controller line 146 and a zero feed rate alarm 175. A typical low level alarm 171 (and relay 170) or zero feed rate alarm 175 by themselves can not tell the operator if a tank 120 is actually "exhausted" or "empty" and that this switchover has occurred. The low level alarm 171 indicates that the amount of chemical 124 in the supply tank 120 is below a certain level and that it is getting "close to empty". Although the low level alarm may be activated, there still may be chemical in the tank 120. On the other hand, a zero feed rate condition and zero feed rate alarm 175 could simply be a full tank on standby. However, by combining both alarms (low level alarm 171 and zero feed rate alarm 175) together, it can be appreciated that the system 100 can have a much better idea of when the tank 120 is "exhausted" and that switchover has occurred. This can be helpful for operators at a remote location to know when they have to go out and remove the empty supply tank 120, and replace it with a full tank in the standby position.

Figure 2:
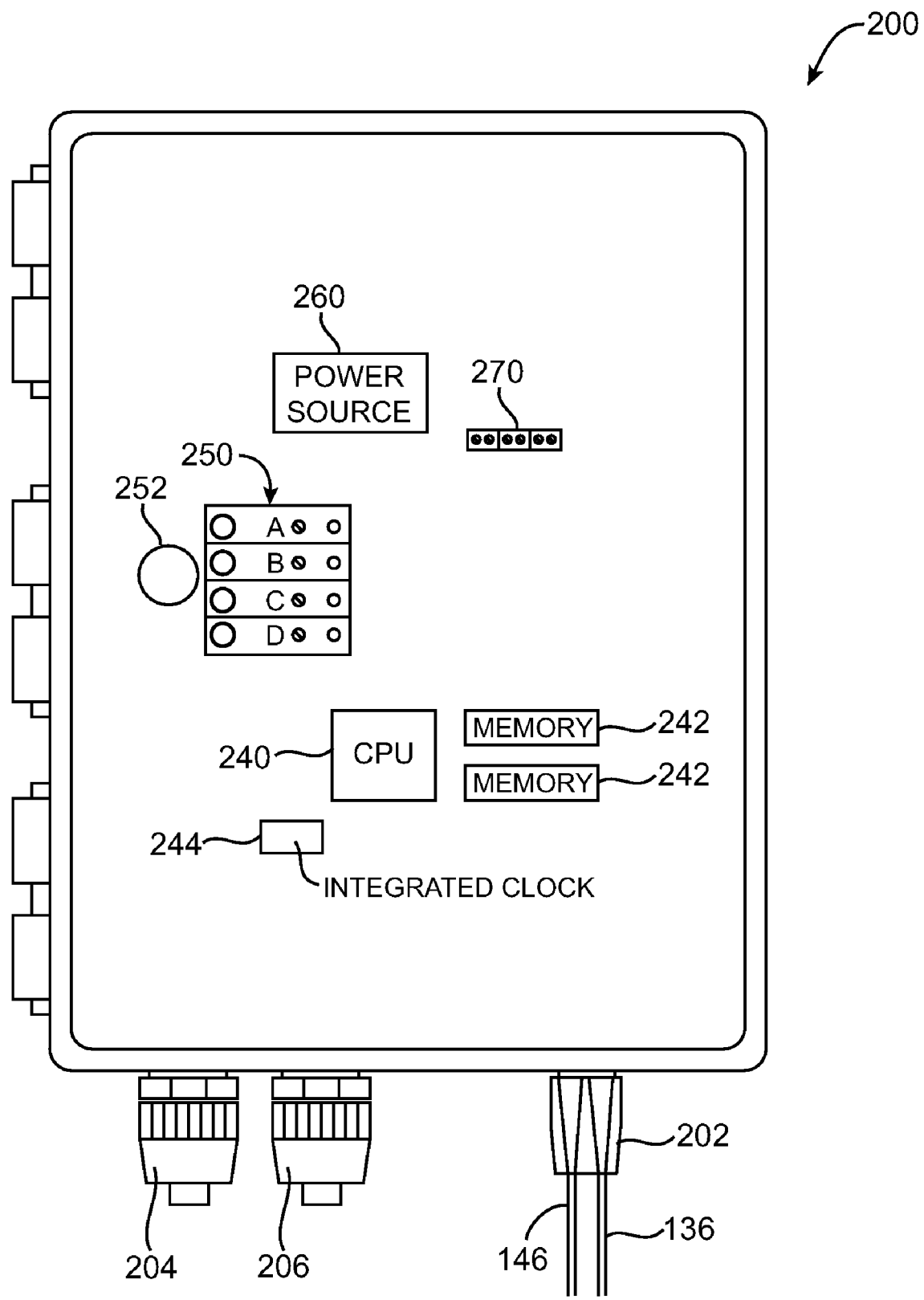
FIG. 2 shows a schematic view of the component layout of a controller used in the system and method of the present invention.

FIG. 2 shows a schematic view of the component layout of a system controller 200 used in the system and method of the present invention. In use, the system controller 200 receives the electrical signal and converts the electrical signal via a microprocessor CPU 240 to a displayable signal indicative of the amount of chemical 124 remaining in the vessel or day tank 120. As shown in FIG. 2, the system controller 200 includes a microprocessor CPU 240, memories 242, and relays 250. The microprocessor 240 (CPU) converts the electrical signal into a displayable signal indicative of an amount of gas or chemical remaining in the vessel 120. The system controller 200 is powered by a power source 260. The power source 260 is battery operated; however units equipped with a 4-20 mA output 272 use the DC loop power required for the output signal as the primary power, and the battery power as secondary power in the event that the 4-20 loop power fails.

An integrated time clock 244 within the system controller 200 allows computation of "loss in weight" feed rates and daily chemical/gas usage data. In one embodiment, the system controller 200 includes a 4-20 mA output signal 272 capable of remotely transmitting remaining chemical; chemical feed rates 274 or daily usage data 276. In addition, the system controller 200 can also include a hi/lo level dry relay 270 for remotely alarming remaining chemical, chemical feed rate, chemical feed rates or daily usage.

The system controller 200 is preferably a hermetically sealed polypropylene case with front cam lock bezel and having a plurality of connectors 202, 204, 206, which include connector 202, which is configured to receive connector lines 136, 146. The system controller 200 includes a standard case connection for cable or wiring and will be a standard plastic, and a compression fitting. The fitting will preferably accommodate a 2-wire jacket (4/20 mA) or a 7-wire jacket (4/20 mA and 1 SPDT switch element). The connections for both the switch and 4/20 mA output will preferably be 24" flying leads. However, it can be appreciated that other connections can be used as known to one skilled in the art.

The system controller 200 will also preferably have a non-volatile memory. Accordingly, if the system controller 200 is turned off or power is disconnected for any reason, stored parameters will be saved in memory.

FIG. 3 shows a schematic view of a controller face illustrating the keypad functions and display of the controller used in the system and method of this invention. As shown in FIG. 3, the system controller 200 includes a first display 210 configured to display remaining gas or chemical 114, 124, an input keyboard 220, a second display 220 configured to display a schematic drawing of the supply or day tank 290 with a schematic of the tank load key 280 and it various positions 232, 234, and 236 for hand or manual refilling of the day or supply tank 120.

The display 210 preferably has a 16 character two-line alphanumeric display 212, 214 which includes:

First Line 212—"NET REMAINING"

Second Line 214—Rotates from "DAILY USAGE"; "DAYS UNTIL EMPTY"; "TOTAL USAGE"; "PERCENT FULL"; "BASE UNITS"; "BULK TIME"; "BAR GRAPH" and/or "RATE OF FEED", for example, TOTAL USAGE "SCALE 1=2345 LB"

The input keyboard 220 has a plurality of functional buttons 212 on the keypad 220, which can include the following:

0. "SCALE SELECT" button: for selecting a specific scale;

1. "DISPLAY SELECT" button: for selecting a specific display;

2. "USAGE LOG" button: for displaying the daily usage for each of the prior 31 days;

3. "ESC" button: to escape out of Menus to the display mode;

4. "TIME DATE" button: for displaying and setting the time and date;

5. "TANK LOAD" button: for pausing usage accumulation during tank refilling;

6. "MENU" button with a down arrow for scrolling "down";

7. "MENU" button with an up arrow for scrolling "up"; the MENU button preferably has 8 scrollable (through the use of up and down buttons) menu options. These items wrap when scrolling in either direction 8. "DEL" button: for deleting selected items; and 9. "ENTER" button: allows for saving a selected item to memory.

The supply tank schematic 290 also includes with a series of usage and/or filling reference points. The first relay 292 corresponds to set point 1, "low level alarm"; the second relay 294 corresponds to set point 2, "transfer pump on"; the third relay 296 corresponds to set point 3, "transfer pump off"; and the fourth relay 298 corresponds to set point 4, "high level alarm." In addition, the day or supply tank schematic 290 can be equipped with an option lighting system comprised of a "transfer pump off" light 297 and a "transfer pump on" light 295. The transfer pump off and transfer pump on lights 297, 295 are preferably green in nature; however, other suitable colors can be implemented.

In an alternative embodiment, the system 100 can include one or more supply tanks 120, 160, wherein the system controller 200 can receive signals 136, 146 from the one or more supply or day tanks 120, 160. Accordingly, the system controller 200 can be used to simultaneously monitor levels in a plurality of separate supply tanks 120, 160. In addition, each tank 120, 160 can be monitored independently as well as get the combined totals for all the tanks. The "Daily Usage" data logging function allows for easy record keeping and a "Days Until Empty" function makes it simple to anticipate tank refilling and chemical reorder points. It can be appreciated that the display 210 can allow the user to monitor chemicals in Lbs, Kgs, Gallons, Liters or Percent of Full.

In addition, the system controller 200 allows the operator to monitor chemical feed rates, which can be alarmed or transmitted via a 4-20 ma signal 270. This feature allows early warning of dangerously low or high feed rate conditions and therefore prevents hazardous under or overdosing of chemicals to your water supply. The system controller 200 also provides up to four set points, each triggering dry or solid-state relays. These relays can be programmed for high or low level alarms, automating chemical transfer from bulk to day tanks or diluting chemicals down from their full strength. These features prevent the hazards of running out of chemicals or accidental overfilling of tanks.

While this invention has been described with reference to the preferred embodiment described above, it will be appreciated that the configuration of this invention can be varied and that the scope of this invention is defined by the following claims.

What is claimed is:

1. A system for calculating chemical usage comprising:
    a source of chemical feed;
    a supply tank of known capacity, which receives a chemical feed from the source of chemical feed, the tank mounted upon an electronic scale, the scale being capable of generating a series of signals related to the weight of the tank when empty and at various levels of fill;
    a water system which receives the chemical feed from the supply tank; and
    a system controller:
        for receiving a series of signals from the scale relating to the weight of the supply tank;
        for calculating chemical usage by inputting into the system controller the series of signal from the scale relating to the weight of the supply tank when empty and at various levels of fill;
        for refilling the supply tank from the source of chemical feed;
        for calculating a projected chemical usage during refilling of the supply tank by:
            obtaining a fill time for the refilling of the supply tank; and
            calculating the projected chemical usage during refilling based on a chemical feed rate times the fill time; and
        for calculating a total usage of chemical over a defined variable period of time by adding the projected chemical usage during refilling to chemical usage calculated by the system controller.

2. The system of claim 1, wherein the system control further includes an internal usage accumulator relating to an amount of chemical being fed from the supply tank to the water system.

3. The system of claim 1, further comprising a chemical feed flow controller for controlling the flow of chemical from the source of the chemical feed to the supply tank.

4. The system of claim 1, wherein the system controller further includes a display for displaying the amount of chemical remaining in the vessel.

5. The system of claim 1, further comprising a load key, wherein the load key controls the filling of the supply tank in a manual or an automatic fill mode.

6. The system of claim 1, wherein the system controller further includes an integrated time clock that allows computation of "loss in weight" feed rates and daily chemical or gas usage data.

7. The system of claim 1, wherein the system controller further includes a 4-20 mA output signal capable of remotely transmitting remaining chemical, chemical feed rates or daily usage data.

8. The system of claim 1, wherein the system controller further includes a hi/lo level dry relay contact for remotely alarming remaining chemical, chemical feed rate, and chemical feed rates or daily usage rates.

9. The system of claim 1, further comprising;
    a zero feed rate alarm, which compares a weight of supply tank measured by the scale with a minimum weight value and triggers an alarm if the measured weight is less than the minimum value; and
    a supply tank lo level alarm which compares the weight of material in the supply tank, as measured by the scale with a minimum value related to the capacity of the dilution tank and triggers an alarm if the measured value is equal to or exceed the maximum value and the desired degree of dilution had not been achieved.

10. The system of claim 1, additionally comprising a metering pump for feeding chemical to a source of water wherein said system controller receives a valve related to a speed of the metering pump and calculates the amounts of chemical required to provide a target amount of chemical of a desired diluted concentration for operating the metering pump at an optimum efficiency.

11. The system of claim 1, wherein the source of chemical feed is a bulk tank having a source of chemical feed.

12. The system of claim 1, further comprising a chemical feed flow controller for controlling the flow of chemical feed from the source of chemical feed to the supply tank.

13. The system of claim 1, further comprising an additional supply tank, wherein upon exhaustion of the supply tank, the additional supply tank provides an additional source of chemical feed to the water system.

14. The system of claim 1, wherein the water system is a municipal wastewater system.

15. The system of claim 11, further comprising calculating an amount of chemical feed within the bulk tank by subtracting the total usage of chemical over the variable period of time from a total capacity of the bulk tank.

* * * * *